United States Patent [19]

Evans

[11] Patent Number: 4,953,792

[45] Date of Patent: Sep. 4, 1990

[54] DRY POWDER APPLICATOR

[75] Inventor: William E. Evans, Jacksonville, Fla.

[73] Assignee: Roussel Bio Corporation, Englewood Cliffs, N.J.

[21] Appl. No.: 309,282

[22] Filed: Feb. 10, 1989

[51] Int. Cl.[5] .......... B65G 53/38

[52] U.S. Cl. .......... 239/654; 406/138

[58] Field of Search .......... 406/91, 138, 144, 153, 406/136, 146, 153, 492; 239/654, 364, 325

[56] References Cited

U.S. PATENT DOCUMENTS

| | | | |
|---|---|---|---|
| 1,624,321 | 4/1927 | Dunnagan | 222/195 |
| 1,636,331 | 7/1927 | Smith . | |
| 1,668,080 | 5/1928 | Mack | 239/112 X |
| 1,730,195 | 10/1929 | Davis | 406/153 X |
| 1,946,780 | 2/1934 | Costello | 406/138 X |
| 2,012,973 | 9/1935 | Parker | 299/29 |
| 2,091,055 | 8/1937 | Roselund et al. | 239/654 |
| 2,356,950 | 8/1944 | Root | 43/148 |
| 2,683,327 | 7/1954 | Hagens | 43/148 |
| 2,759,293 | 8/1956 | Weller | 43/148 |
| 2,792,971 | 5/1957 | Kaiser | 222/193 |
| 2,817,310 | 12/1957 | Ponzini | 118/46 |
| 3,134,513 | 5/1964 | Ashman | 406/138 |
| 3,434,758 | 3/1969 | Fry | 118/308 |
| 3,720,533 | 3/1973 | Gallagher | 117/21 |
| 3,896,998 | 7/1975 | Vertue | 239/654 X |
| 3,933,394 | 1/1976 | Klein et al. | 406/138 X |
| 4,018,185 | 4/1977 | Myers | 118/308 |
| 4,311,113 | 1/1982 | Jordan | 118/629 |
| 4,334,494 | 6/1982 | Kane | 118/63 |
| 4,474,327 | 10/1984 | Mattson et al. | 406/138 X |
| 4,552,490 | 11/1985 | Neale | 239/112 X |
| 4,553,698 | 11/1985 | Parker et al. | 239/3 |

FOREIGN PATENT DOCUMENTS

| | | | |
|---|---|---|---|
| 2659058 | 7/1978 | Fed. Rep. of Germany | 406/153 |
| 1191010 | 11/1985 | U.S.S.R. | 239/654 |

*Primary Examiner*—Andres Kashnikow
*Assistant Examiner*—Kevin P. Weldon
*Attorney, Agent, or Firm*—Allegretti & Witcoff, Ltd.

[57] ABSTRACT

A dry pesticide applicator is disclosed. The applicator includes a fluidizing medium secured within a housing. A blower mechanism generates a flow of air through the fluidizing medium to establish a fluidized bed within the housing. This fluidized bed is drawn into a dusting by means of a venturi to create a powdered stream. Whenever the dispensing mechanism is inoperative, the fluid flow which creates the powdered stream (by drawing the fluidized bed through a powder inlet) is directed into the housing through the powder inlet to purge any accumulation of powdered material therein.

7 Claims, 2 Drawing Sheets

DRY POWDER APPLICATOR

BACKGROUND OF THE INVENTION

The present invention relates generally to a powder dispensing apparatus and more particularly to dry pesticide applicator.

Dry pesticides have proven more effective than water-based or oil-based forms. This is due, in part, to the fact that the dry pesticides have a more permanent presence. Liquid pesticides tend to soak into surfaces or settle into depressions, thereby providing a pesticide-free path. Unfortunately the development of powder applicators has lagged the development of dry pesticides.

The presently available equipment falls into three categories: (1) crack and crevice, (2) wall void, and (3) space. The categories are also exclusive, e.g., an apparatus designated for space applications cannot be utilized effectively as a crack and crevice applicator.

Crack and crevice application relates to the dusting of relatively small harborage areas (such as the spaces between cabinets and appliances). One type of crack and crevice device includes a bellows-like container and applicator tube. The container is squeezed, expelling pesticide from the tube. This type is suited for only the smallest pest control projects, as refilling and fatigue are significant factors.

The second type of crack and crevice applicator is the aerosol dispenser, which is again limited to relatively small pest control situations. In addition, the aerosol medium can have a destructive effect (e.g., staining) upon certain materials, such as plastics, often found in the home or business place.

The third type of crack and crevice applicator utilizes a compressor to dispense the dry pesticide. Compressors are not well suited for pesticide application due to the formation of condensation. The wetness is transmitted to the pesticide powder, causing agglomeration and blockage of the delivery system.

Wall void application relates to the dusting of constructional voids, such as the hollow space in walls. These void areas are usually accessible through only a single opening which renders uniform and complete dusting more difficult. The presently available wall void applicators again include a compressor-type mechanism in order to overcome the back pressure and lack of flow-through problems. Wetness is therefore a problem as is incomplete, inconsistent dispersion of pesticide. Generally an excessive amount of pesticide is used to ensure adequate dusting.

Space application involves the pesticide treatment of large open areas, such as a crawl space, and the ideal application is minimum quantity with uniform dispersion. In the presently available space applicators, dusting is propelled by a motor (electric or gas), and the primary difficulty relates to over-application of the pesticide powder.

SUMMARY OF THE INVENTION

In a principal aspect, the present invention is an apparatus for dispensing a powdered material, such as a dry pesticide. The present invention is, in its preferred embodiment, a dry pesticide applicator, capable of crack and crevice, wall void, and space operation.

The present invention includes a housing to receive the powdered material, a fluidized medium within the housing, a dusting duct, a blower mechanism, and a dispenser mechanism. The fluidizing medium is positioned within the housing, thereby defining an expansion chamber and a hopper chamber. The fluidizing medium is selected to pass a fluid stream in one direction without passing the powdered material in the other direction.

The dusting duct extends through the hopper and includes a fluid inlet, a powder inlet and a dusting outlet. The powder inlet provides communication between the dusting duct and the hopper chamber and has a predetermined orientation with respect to the expansion chamber.

The blower mechanism provides a first, mixture fluid flow to the expansion chamber and a second, dispersion fluid flow to the fluid inlet of the dusting duct. The first fluid flow passes through the fluidizing medium to create a fluidized bed of powdered material (i.e., a powdered suspension) in the hopper chamber. Passage of the second fluid flow through the dusting duct draws this fluidized bed through the powder inlet, thereby creating a powdered stream. The dispenser mechanism receives and dispenses this powdered stream.

The dusting duct, orientation of the powder inlet and blower mechanism operate in conjunction and cooperation to define a purging system for cleaning the powder inlet. This substantially avoids the accumulation of powdered material about the powder inlet and the ultimate clogging thereof.

It is thus an object of the present invention to provide a reasonably priced, reliable powder applicator. It is also an object to provide a dry pesticide dispensing apparatus which substantially avoids the condensation problem associated with compressor-driven applicators. Another object is a multi-function dry pesticide applicator.

A further object of the present invention is a powder applicator which is substantially self-purging or self-cleaning and thereby substantially avoids blockage or clogging. It is also an object to provide a dry pesticide applicator which is capable of substantially uniform dusting.

Yet another object is a dry pesticide applicator wherein the amount of pesticide application is controllable so as to enhance overall efficiency and effectiveness. Still another object is a dry pesticide applicator wherein an electrical charge is developed upon the pesticide particles to substantially improve coverage life.

These and other features, objects and advantages of the present invention are set forth or apparent in the following description of a preferred embodiment.

BRIEF DESCRIPTION OF THE DRAWING

A preferred embodiment of the present invention is described, in detail, with reference to the drawing wherein.

DETAILED DESCRIPTION OF A PREFERRED EMBODIMENT

Figure 1:
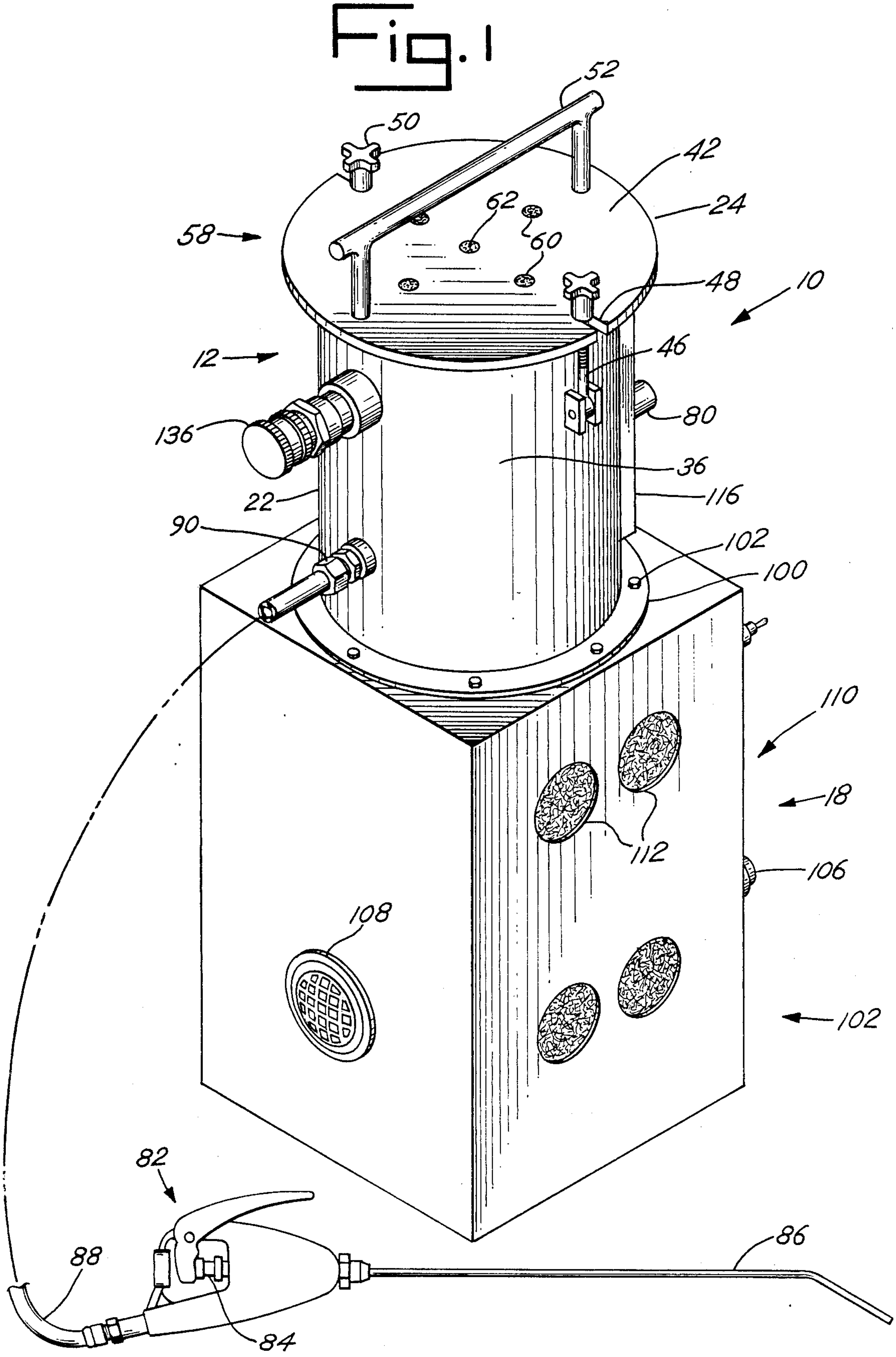
FIG. 1 is a perspective view.
Figure 2:
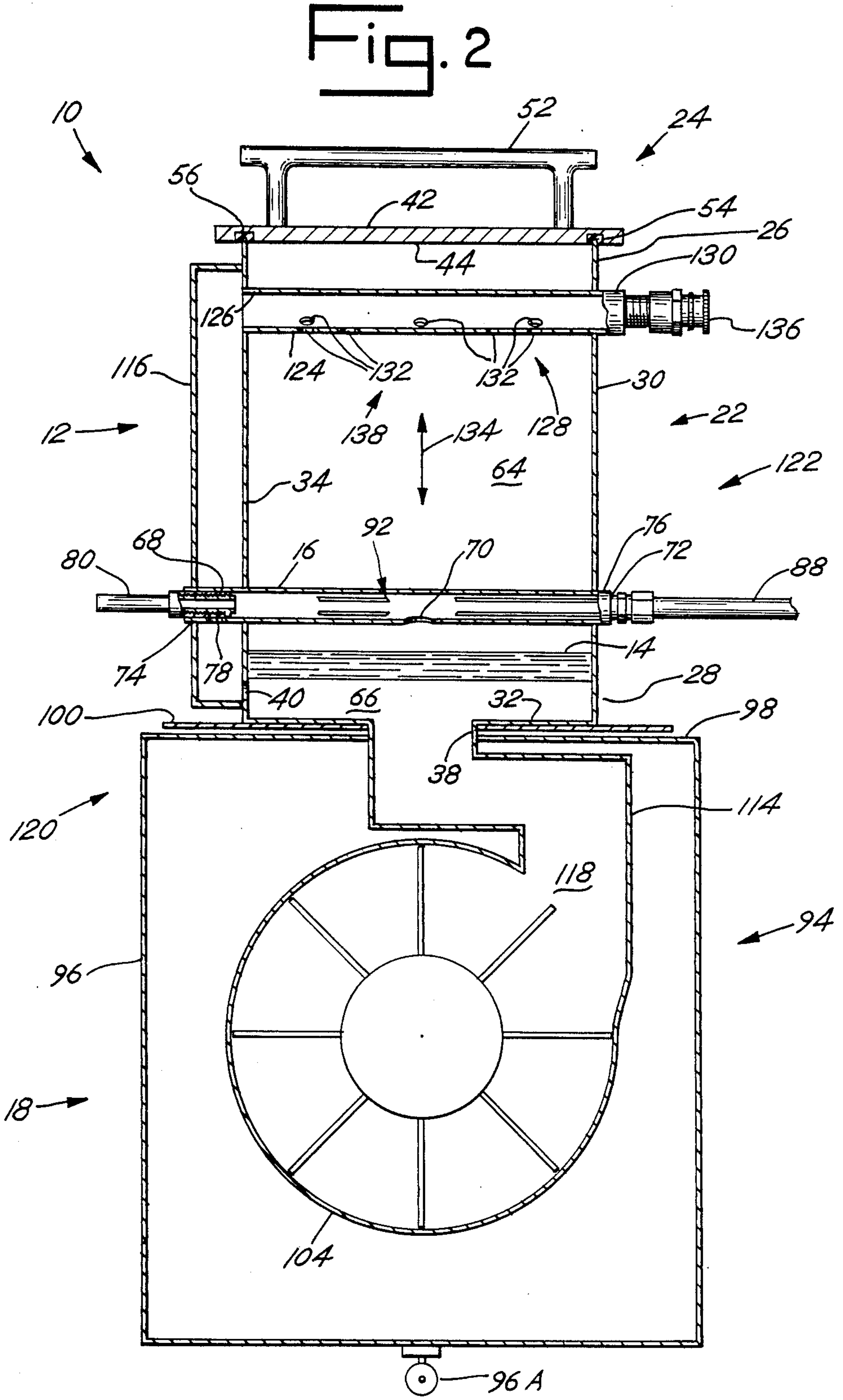
FIG. 2 is a partial cross-sectional view of the preferred embodiment of FIG. 1.

A preferred embodiment of the present invention is shown in FIGS. 1 and 2 as a dry pesticide applicator 10. In the broadest terms, the applicator 10 includes a housing 12, a fluidizing medium 14, a dusting duct 16, blower means 18 and dispensing means 20.

The housing 12 includes a preferably cylindrical base 22 and a removable cover 24. The base 22 has an open upper end 26 and a partially closed lower end 28, as defined by a cylindrical sidewall 30 and an annular base plate 32 substantially perpendicular thereto. The sidewall 30 has an interior wall surface 34 and an exterior wall surface 36, and as best shown in FIG. 2, the base plate 32 defines a central, circular inlet opening 38. The base 22 further defines an access opening 40 through the sidewall 30 substantially adjacent the partially closed lower end 28.

The cover 24 is circular in shape and has an upper cover surface 42 and a lower cover surface 44. As shown in FIG. 1, locking bolts 46 are rotatably attached in opposed fashion to the exterior wall surface 36 of the housing 12, near the upper open end 26. The bolts 46 engage opposed slots 48 in the cover 24, such that the cover 24 can be affixed in an assembled state by locking nuts 50.

The cover 24 includes a handle 52 secured to the upper cover surface 42 thereof. As best shown in FIG. 2, the cover 24 preferably defines an annular groove 54 on the lower cover surface 44. The groove 54 is adapted to receive the upper open end 26 of the base 22 in the assembled state. Preferably the housing 12 further includes a rubber seal 56 adapted to fit within the groove 54, interposing the base 22 and the cover 24.

The housing 12 also includes pressure regulating means, generally designated 58. In the preferred embodiment, the pressure regulating means 58 includes a series of vents 60 in the cover 24. Each vent 60 constitutes an opening filled with a porous filter medium 62. The filter medium 62 preferably comprises any known porous materia that allows sufficient air to escape from the housing 12 to avoid an internal housing pressure exceeding approximately five pounds per square inch ("PSI"). Most preferably, the porous filter comprises a porous plastic media. Alternatively, the filter may be composed of silica beads dispersed in an adhesive material. The filter medium should have pore openings less than 5 milcrons to prevent loss of powder during venting.

Referring again to FIG. 2, the fluidizing medium 14 is positioned and secured within the housing 12 so as to define an upper hopper chamber 64 and a lower expansion chamber 66. The fluidizing medium 14 is secured above the access opening 40.

The fluidizing medium 14 is a porous filter material, preferably composed of the same materials of construction as filter medium 62 and having the same pore size specification. The fluidizing medium 14 is adapted to function as the floor of the hopper chamber 64, maintaining the dry pesticide therein. The medium 14 readily passes a fluid, such as air.

The dusting duct 16 extends through the upper hopper chamber 64 of the base 22. In this preferred embodiment, the dusting duct 16 is located near and slightly above the fluidizing medium 14. The dusting duct 16 includes a fluid inlet 68, a powder inlet 70 and a dusting outlet 72. As shown, a first end 74 of the dusting duct 16 extends through the sidewall 30 to define the fluid inlet 68 and a second end 76 defines the dusting outlet 72.

In this preferred embodiment, the dusting duct 16 is substantially cylindrical, substantially horizontal within the base 22, and extends along a major diameter thereof. The fluid inlet 68 is defined, in part, by a downwardly extending inlet port 78. A conventional, adjustable valve mechanism 80 is secured to the first end 74 of the dusting duct 16 such that the inlet port 78 may be fully or partially opened or closed.

The dispensing means 20 is secured to the dusting outlet 72 of the dusting duct 16. In this preferred embodiment, the dispensing means 20 is a conventional, lever-actuated spray assembly 82, including a control valve 84, an application rod 86, and a flexible interconnecting tube 88 having a conventional coupling 90. The second end 76 of the dusting duct 16 is threaded to receive the coupling 90 or a cap (not shown) during non-use.

As best shown in FIG. 2, the powder inlet 70 is a single opening having a predetermined orientation with respect to the lower expansion chamber 66. More particularly, the powder inlet 70 is directed substantially towards the expansion chamber 66, i.e., downwardly in this preferred embodiment, such that the dry pesticide does not enter the powder inlet 70 as the base 22 is filled.

Referring still to FIG. 2, the applicator 10 further includes a venturi or venturi mechanism, shown schematically at 92. The venturi 92 is secured within the dusting duct 22 near the powder inlet 70.

The blower means 18 is a conventional electric or gas, forced air motor/fan assembly 94. The assembly 94 preferably includes a rectangular housing 96, having rollers 96A and being sufficient in size to carry the housing 12 on an upper blower surface 98 thereof. The base 22 includes, in this preferred embodiment, a collar 100 secured to the base plate 32 and extending upon the exterior wall surface 36, such that the housing 12 can be secured by screws 102 to the upper blower surface 98. As best shown in FIG. 1, the assembly 94 includes a fan 104, an associated speed control 106, an air intake 108, and blower pressure relief means, generally designated 110. The blower pressure relief means 110 includes a series of blower vents 112, i.e., openings filled with porous filter medium.

The blower means 18 further includes or defines a fluid passageway 114 and an air duct 116. The fluid passageway 114 provides communication between the base 22 and the fan 104. More particularly the fluid passageway 114 extends between the inlet opening 38 and a fan outlet port 118.

The air duct 116 is a preferably rectangular duct secured in a substantially vertical orientation to the exterior wall surface 36 of the base 22. The air duct 116 provides communication between the expansion chamber 66 and the fluid inlet 68 of the dusting duct 16 via the access opening 40.

In this preferred embodiment, the blower means 18 provides or generates a mixture fluid flow (air) into the lower expansion chamber 66 and a dispersion fluid flow into the fluid inlet 68 of the dusting duct 16. The mixture fluid flow passes from the expansion chamber 66 through the fluidizing medium 14 into the upper hopper chamber 64. There it creates a fluidized bed of dry pesticide, i.e., a suspension of dry pesticide dispensed throughout the hopper chamber 64. Excess pressure is relieved via the pressure regulating means 58 without loss of pesticide powder.

A portion of the mixture fluid flow passes through the access opening 40 and into the air duct 116, thereby providing the dispersion fluid flow. This flow is available through the fluid inlet 68 at a predetermined flow rate under regulation of the valve mechanism 80. The regulated dispersion fluid flow passes through the dusting duct 16 and the venturi 92, so as to draw the dry pesticide or more particularly the fluidized bed through the powder inlet 70 at a predetermined mixture rate. This action creates within the dusting duct 16, downstream of the venturi 92 and thus available to the dispensing means 20, a powdered stream, i.e., a pressure-generated stream of air and suspended dry pesticide. The venturi 92 causes the dispersion fluid flow to accelerate, thereby facilitating the drawing process.

Creation of the powdered stream is controlled by the spray assembly 82. Lever actuation opens the control valve 84 such that the powdered stream exits the dusting outlet 72 into the flexible interconnecting tube 88. The rod 86 directs the powdered stream to the desired area of application.

Whenever the control valve 84 is closed, the dispersion fluid flow generated by the blower means 18 passes, under pressure, through the powder inlet 70 into the hopper chamber 64. This action purges the powder inlet 70 of pesticide accumulation and build-up, thereby substantially reducing the possibility of clogging. As such, the dusting duct 16, the orientation of the powder inlet 70 with respect to the expansion chamber 66, and the blower means 18 cooperate to define purge means, generally designated 120, for cleaning the powder inlet 70.

Air passage through the powder inlet 70 and into the hopper chamber 64 also facilitates creation and maintenance of the fluidized bed through added turbulence within the hopper chamber 64. This is particularly significant when the pesticide level drops below the dusting duct 16. As such, the applicator 10 will function effectively until the pesticide supply is totally depleted.

In this preferred embodiment, the fluidizing medium 14, the dusting duct 16, blower means 18 and dispensing means 20 define by cooperation charge means, generally designated 122. The charge means 122 produces an electrostatic charge upon the pesticide particles suspended in the powdered stream. This electrostatic charge is created by the friction of the particles rubbing against the sides of the flexible tubing. The static charge also enhances the application process in that the slightly positively-charged pesticide particles tend to cling to the commonly encountered, slightly negatively-charged surfaces.

The blower means 18 serves yet another function. It heats the mixture fluid flow and the dispersion fluid flow through inherent operation, and thus the powdered stream has an elevated temperature. This temperature increment, in turn, extends the range of the dispensing means 20, by drying and removing any water or moisture associated with the powder particles. The dried and heated powder particles become more fluffy and lighter, and as such, are able to be dispersed a greater distance.

With primary reference again to FIG. 2, this preferred embodiment of the applicator 10 includes a secondary dusting duct 124, which extends through the hopper chamber 64 substantially parallel to the first or primary dusting duct 16. This secondary dusting duct 124 is located adjacent the open upper end 26 of the base 22.

The secondary dusting duct 124 includes a secondary fluid inlet 126, a secondary powder inlet 128, and a secondary dusting outlet 130. The secondary fluid inlet 126 communicates directly with the air duct 116 for receipt of a secondary dispersion fluid flow generated by the blower means 18.

The secondary powder inlet 128 includes a series of openings 132, equally spaced along the secondary dusting duct 124 and having a secondary predetermined orientation with respect to the expansion chamber 66. In this preferred embodiment, the secondary predetermined orientation is substantially downwardly and towards the expansion chamber 66 to avoid pesticide accumulation in the secondary dusting duct 124 during addition thereof to the base 22. More particularly, each opening 132 extends parallel to or at a small angle (e.g., less than 15 degrees) with respect to the longitudinal axis 134 of the housing 12 in an alternating pattern. As such, only six of nine openings 132 are shown in FIG. 2.

The secondary dusting outlet 130 is threaded to receive a cap 136 during non-use. With the cap 136 in place, the secondary dispersion fluid passes through the secondary powder inlet 128 adding turbulence to the hopper chamber 64. This flow, as established by the openings 132, also impinges upon a majority of interior wall surface 34 of the base 22, thereby removing any pesticide coating or buildup. As such, the blower means 18, secondary dusting duct 124 and predetermined secondary orientation of the secondary powder inlet 128 cooperatively define secondary purge means, generally designated 138, for cleaning the secondary powder inlet 128 as well as the interior wall surface 34 of the housing 12.

In this preferred embodiment, the inside diameter of the secondary dusting duct 124 is about 2 to about 4 times larger than the primary dusting duct 16. As such, the primary dusting duct 16 is utilized for crack and crevice applications and wall void applications. The secondary dusting duct 124 is used for space applications. An extension hose (not shown) preferably about 1 inch outside diameter, may be threaded onto dusting outlet 130 in place of cap 136. The length of the extension hose can be up to 20 feet in length, or enough to reach the average height of a ceiling in a home or commercial building. The flow of powder through the extension hose may be controlled by any suitable valve, preferably a butterfly type hand actuated valve (similar in nature to the control valve (84)). The applicator 10 is placed at the highest possible elevation and periodically the direction of the secondary dusting outlet 130 is advanced.

A preferred embodiment of the present invention has been described herein. It is to be understood that modifications and changes can be made without departing from the true scope and spirit of the present invention, which are defined by the following claims to be interpreted in view of the foregoing.

What is claimed is:

1. An apparatus for dispensing a powdered material comprising, in combination:

a housing adapted to receive said powdered material;

a fluidizing medium positioned within said housing so as to define a lower expansion chamber and an upper hopper chamber;

a dusting duct extending through said upper hopper chamber and including a fluid inlet external to said housing, a powder inlet within said housing, and a dusting outlet external to said housing, said powder inlet having a substantially downward orientation;

blower means for generating a mixture fluid flow into said expansion chamber and a dispersion fluid flow into said fluid inlet, said mixture fluid flow passing through said fluidizing medium to create a fluidized bed of said powdered material within said hopper chamber; and dispenser means, in communication with said dusting outlet, for selectively dispensing said powdered material, said dispenser means having an open state for dispensing and a closed state;

said dispersion fluid flow passing through said dusting outlet at a predetermined flow rate and drawing said fluidized bed at a predetermined mixture rate through said powder inlet to create a powdered stream whenever said dispenser means is in said open state;

said dispersion fluid flow passing through said powder inlet into said upper hopper chamber whenever said dispensing means is in said closed state to purge said powder inlet of said powdered material accumulated therein, whereby clogging thereof is substantially avoided.

2. An apparatus as claimed in claim 1 further comprising:

a secondary dusting duct extending through said hopper chamber above said dusting duct, said secondary dusting duct having a cross-sectional area greater than said ducting duct and including a secondary fluid inlet in communication with said blower means, a series of secondary powder inlets, within said housing, and a secondary dusting outlet external to said housing;

secondary outlet means for selectively closing said secondary dusting outlet;

said blower means generating a secondary dispersion fluid flow into said secondary fluid inlet;

said secondary dispersion fluid flow passing through said secondary powder inlets and into said upper hopper chamber whenever said secondary dusting outlet is closed, said secondary powder inlets directing said secondary dispersion fluid flow against said housing to substantially avoid accumulation of said powdered material thereon.

3. An apparatus as claimed in claim 2 wherein said secondary outlet means includes secondary dispersion means for selectively opening said secondary dusting outlet and for dispersing said powdered material, said secondary dispersion fluid flow passing through said secondary dusting outlet at a rate exceeding the maximum of said predetermined flow rate and drawing said fluidized bed through said secondary powder inlets whenever said secondary dusting outlet is open.

4. An apparatus as claimed in claim 1 or 3 wherein said fluidizing medium, said dusting duct, said blower means and said dispensing means cooperatively defining charge means for producing an electrostatic charge upon said powdered material in said powdered stream.

5. An apparatus as claimed in claim 1 or 3 further comprising a venturi within said dusting duct adjacent said powder inlet to facilitate drawing of said fluidized bed.

6. An apparatus as claimed in claim 1 or 3 further comprising regulator means for controlling said predetermined flow rate of said dispersion fluid flow.

7. An apparatus as claimed in claim 1 or 3 wherein said dispenser means includes a control valve.

* * * * *